United States Patent [19]
Pannell

[11] 3,856,276
[45] Dec. 24, 1974

[54] COMPOST PROCESSING MACHINE

[76] Inventor: Robert T. Pannell, R.D. No. 1, Avondale, Pa. 19118

[22] Filed: Sept. 8, 1972

[21] Appl. No.: 287,473

[52] U.S. Cl............... 259/183, 23/259.1, 259/6, 259/DIG. 37
[51] Int. Cl............................................. B01f
[58] Field of Search........... 23/259.1; 37/9; 56/345; 259/6, 183, DIG. 37, DIG. 31; 198/9, 36, 76, 82

[56] References Cited
UNITED STATES PATENTS

| | | | |
|---|---|---|---|
| 1,916,548 | 7/1933 | Wood | 259/183 |
| 3,051,459 | 8/1962 | Witzenburg | 259/DIG. 31 |
| 3,386,705 | 6/1968 | Griffin | 259/6 |
| 3,565,585 | 2/1971 | Engeler | 23/259.1 |

FOREIGN PATENTS OR APPLICATIONS

| | | | |
|---|---|---|---|
| 289,375 | 12/1915 | Germany | 259/DIG. 37 |

Primary Examiner—Harvey C. Hornsby
Attorney, Agent, or Firm—Mortenson & Weigel

[57] ABSTRACT

The compost processing machine described is in the form of a wheeled main frame with receiving side panels at the front end and stacking gates at the rear end for traversing and processing compost into stacks. Mounted within the main frame is a pronged pick-up drum which lifts the compost and throws it onto a mixing drum having alternate, angularly disposed diverting plates thereon which function to separate, mix and stack the compost. The prongs on the pick-up drum have an enlarged, paddle-like end portion which functions to sweep the deck or surface over which the compost processing machine traverses and also reduces damage to the composting material.

10 Claims, 8 Drawing Figures

3,856,276

PATENTED DEC 24 1974

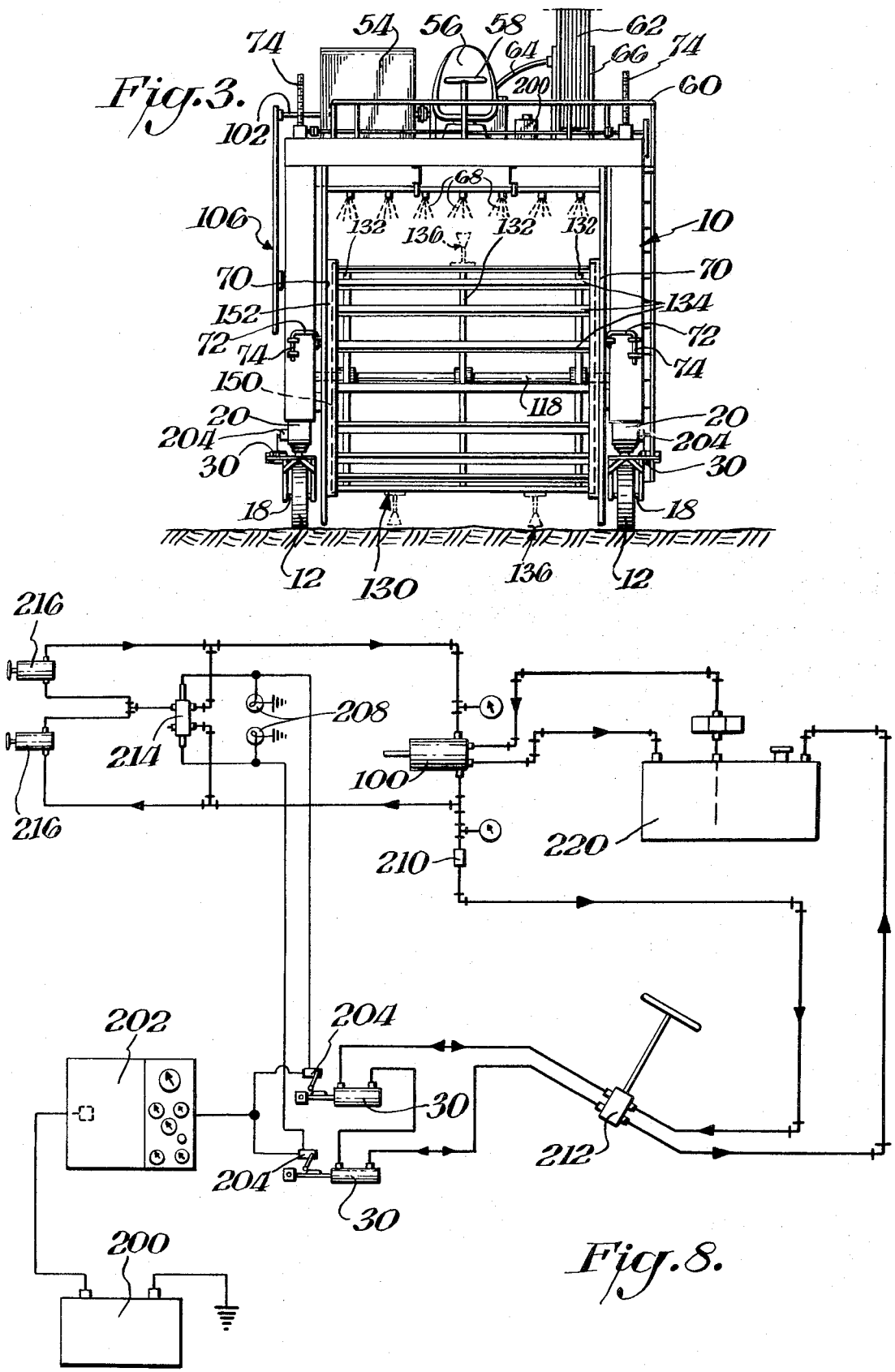

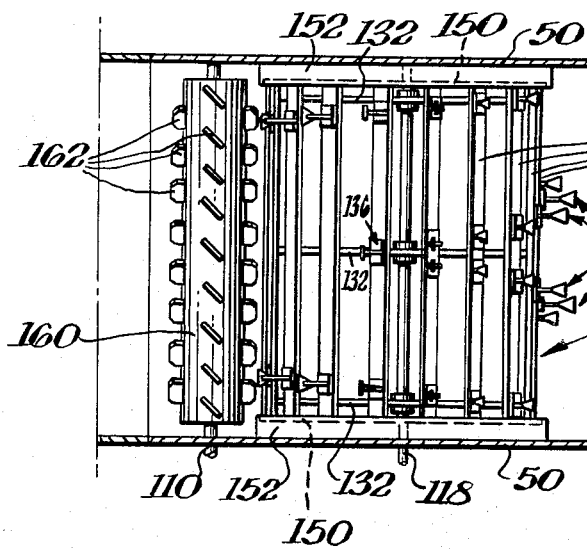
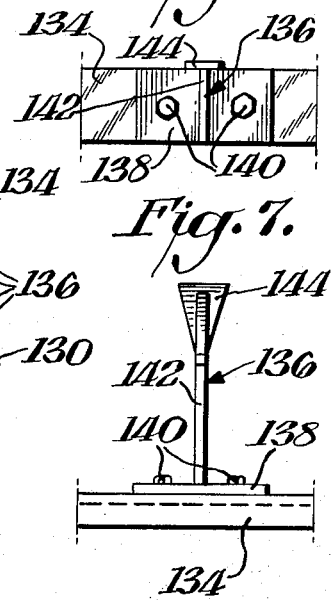
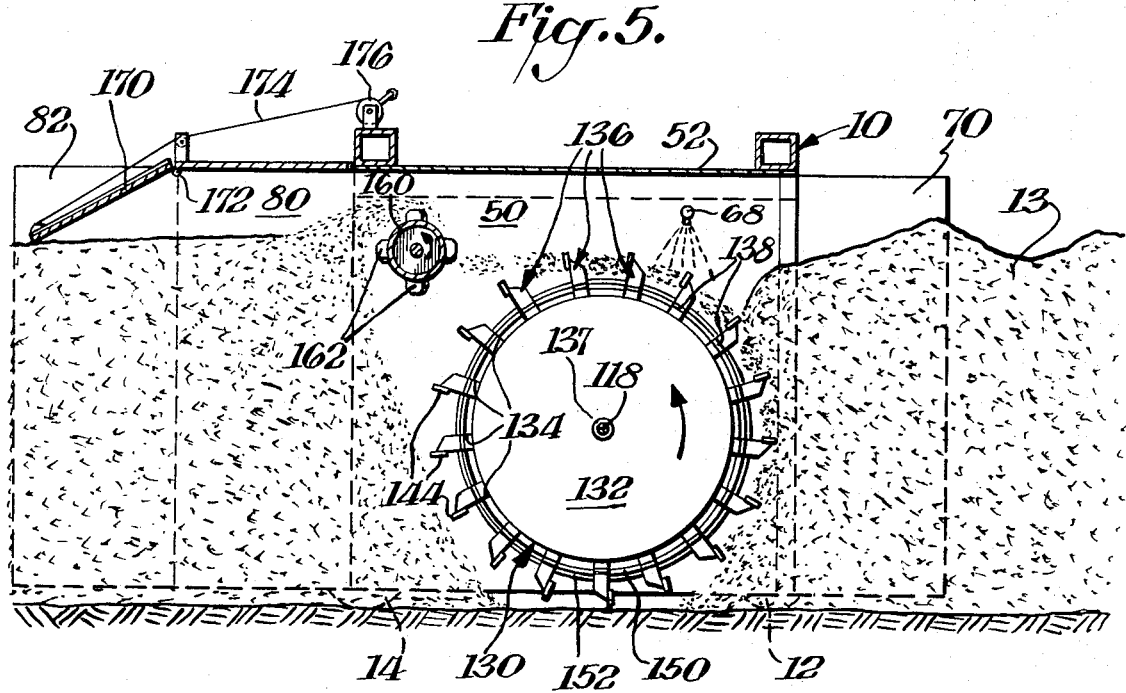

COMPOST PROCESSING MACHINE

BACKGROUND OF THE INVENTION

This invention relates to a composting machine for separating, mixing and stacking fermenting compost and, more particularly, to a compost processing machine which more effectively intermixes the compost during processing.

The mushroom industry over the last several years has been turning more and more to the so-called synthetic composts as opposed to the formerly used natural composts derived primarily from horse manure. The synthetic mushroom compost typically is made up of corn cobs, hay, and various chemical additives in known proportions. The corn cobs, hay and other materials are mixed together and then stacked in long piles of managable proportions according to the needs of the individual growers. The piles of compost are wetted with water and maintained continually wet and allowed to ferment for a period of time, usually 7 to 8 days. After this initial fermentation, the compost pile is "turned." During this turning of the compost piles, the compost must be lifted up, wetted, aerated and intermixed to insure that all of the particles of the compost have been adequately oxidized or exposed to oxygen to permit the fermentation and slow oxidation processes to continue. Depending upon the rapidity of the fermentation process, weather conditions, and the like, the piles may be turned several more times until the compost has been adequately fermented, each turning being for the purpose of further mixing, watering and aeration of the piles. When the compost is ready, it is then loaded into the various mushroom beds, spawn applied and the mushroom growing now begins.

Natural compost must also be turned, but being more dense and having fewer fibrous materials, the job is somewhat more easily managed than is the case with the synthetic compost.

Various machines have been devised over the years to aid in turning the compost whether it be synthetic or natural (formerly the turning was done by hand labor). One such composting machine of the prior art is that described in U.S. Pat. No. 3,565,585 issued Feb. 23, 1971 to Paul Engeler. This machine uses a conveyor belt having relatively slender spikes or tines disposed over the surface of the belt. Unfortunately, these tines have a tendency to rip and tear the hay forming the synthetic compost. While such ripping and tearing does not harm the compost particularly, it reduces the efficiency of the composting machine and as the fermentation continues, renders the compost more and more difficult to pick-up with the small tines. This increases the time required for the turning process and for this reason is an undesirable approach.

Another composting machine is that described in U.S. Pat. No. 3,386,705 issued June 4, 1968 to Gordon D. Griffin. This machine substitutes a tined pick-up roller for the conveyor of Engeler but still suffers from the significant disadvantages of utilizing the slender tines which, as noted hereinbefore, have a tendency to rip and tear the compost. Furthermore, the Griffin machine is relatively inefficient in achieving a thorough intermixing of the compost.

Accordingly, it is an object of this invention to obviate many disadvantages of the prior art compost processing machines.

Another object of this invention is to provide an improved compost processing machine which has less tendency to tear up the organic fibers in the compost than those of the prior art.

Still another object of this invention is to provide an improved compost processing machine which more effectively intermixes the compost during processing.

A further object of this invention is to provide an improved compost processing machine which utilizes a compost pick-up drum to sweep the deck area on which the compost is stacked during processing.

BRIEF DESCRIPTION OF THE PREFERRED EMBODIMENT

The preferred embodiment of this invention is incorporated in a compost processing machine for separating, mixing and stacking fermenting compost. The machine has conventional front and back ends and side walls and is mounted on wheels to facilitate its traversal of a pile of compost during processing. According to the preferred embodiment of this invention, the machine is provided with a rotatable, pronged, pick-up drum mounted between the side walls adjacent the front end of the machine, drive means for rotating the pick-up drum, thereby to lift and move the compost rearwardly as the machine moves forward, rotatable diverter plates positioned to receive compost from the pick-up drum, and means for rotating the plates at a lineal velocity exceeding that of the prongs on the pick-up drum thereby to divert, mix and restack the compost at the back end of the machine.

In accordance with alternative embodiments of the invention, the prongs on the pick-up drum have an enlarged end portion and thereby achieve a paddle-like configuration. This has the advantage of reducing the danger of cutting and tearing the compost. Further the diverter plates each lie in a plane that is transverse to their plane of rotation, thereby to aid in the diverting and mixing of the compost during processing. Preferably, the plates are disposed in rows parallel to their axis of rotation with the plates of each row being disposed parallel to each other and transverse to the plates of adjacent rows, thereby to enhance cross-mixing the compost. In one embodiment, alternate rows of the diverter plates lie at opposite angles with respect to their plane of rotation.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings, in which:

FIG. 3 is a front elevation view of the compost processing machine illustrated in FIG. 1;

FIG. 4 is a fragmentary view of the interior of the compost processing machine showing only the pronged pick-up drum and the mixing drum in operating position, both being constructed according to this invention;

FIG. 5 is a cutaway side elevation view of the compost processing machine of this invention illustrating particularly the relationship between the pick-up drum and the mixing drum;

FIG. 6 is a fragmentary drawing illustrating the manner in which the prongs are attached to the pick-up drum;

FIG. 7 is a fragmentary end elevation view of a single prong of a type illustrated in FIG. 6; and FIG. 8 is a combined pneumatic and electrical schematic diagram illustrating the control connections for the compost processing machine of this invention.

DETAILED DESCRIPTION OF THE PREFERRED EMBODIMENTS

Figure 2:
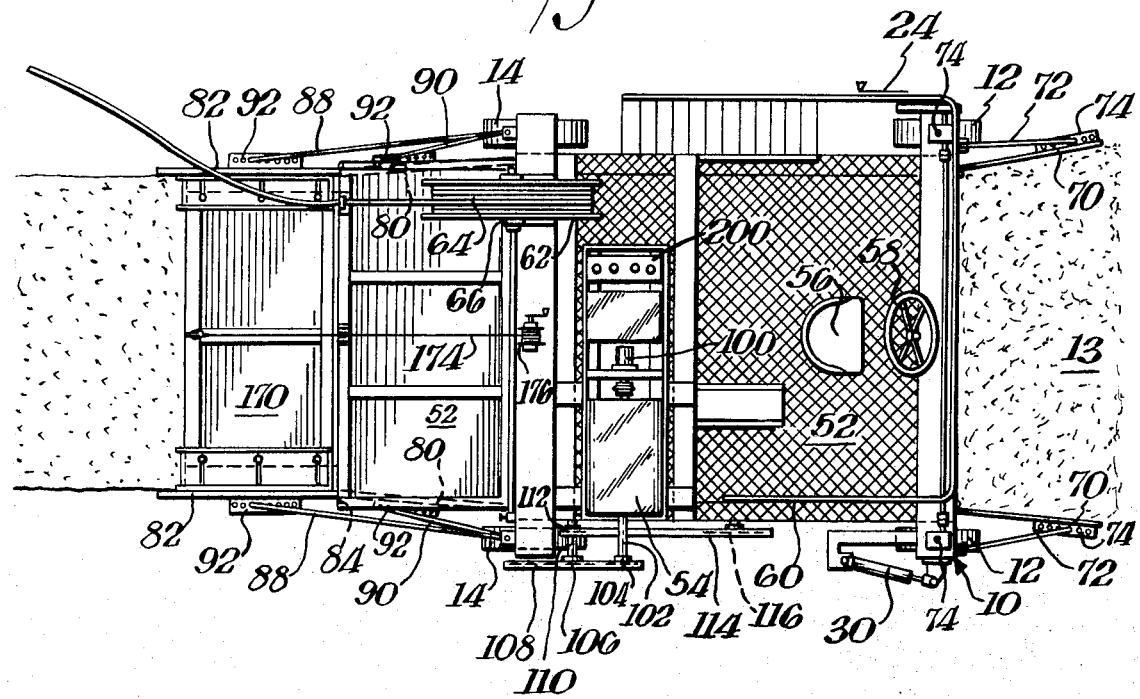
FIG. 2 is a plan view of the compost processing machine illustrated in FIG. 1.
Figure 1:
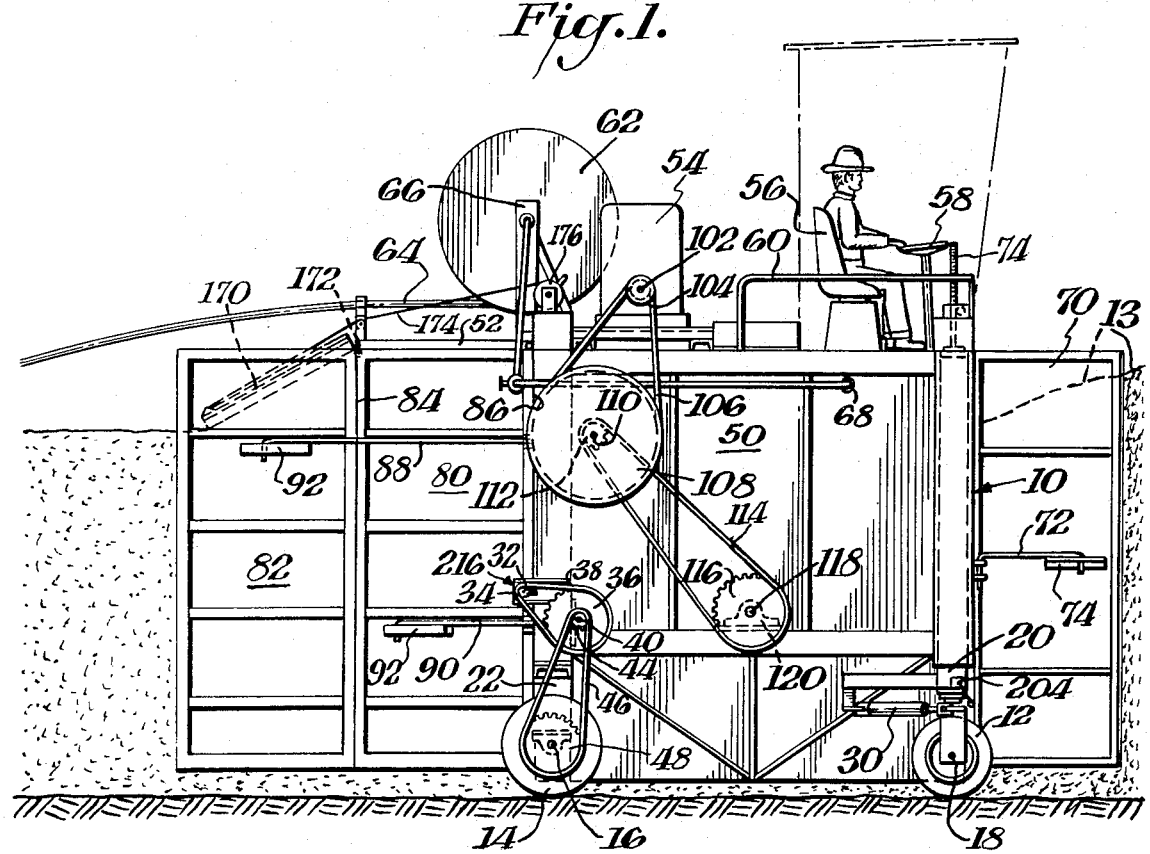
FIG. 1 is a side elevation view of a compost processing machine constructed in accordance with this invention.

The compost processing machine illustrated herein includes a main frame 10 which when viewed from either end of the machine is in the form of an inverted "U." The main frame may be constructed of any suitable structurally strong material such as steel box beams and may be welded together. The main frame 10 is mounted on a set of front wheels 12 and a set of rear wheels 14. Both of the sets of front and rear wheels 12 and 14 are mounted respectively on a front axle 18 and a rear axle 16. The respective axles are suitably mounted to front and rear vertically adjustable posts 20 and 22, respectively. These posts are adjustable vertically by any suitable jacking mechanism of any well known type. Jacking may be accomplished as by the jack handle illustrated at 24 (FIG. 2). The jack handle 24 operates through a chain drive (not shown) to turn a shaft 25 geared at either end to vertically position the posts 20 and 22 which have ratchet gears adapted to be driven by the shaft 25. The front wheels 12 may be turned for guiding purposes by a hydraulic steering system including individual hydraulic motors 30 for each wheel. The control system for these hydraulic motors will be described in conjunction with the description of FIG. 8.

The rear wheels 14 provide the forward motive power for the machine and are powered by a suitable prime mover 54 such as a diesel engine. The prime mover 54 is coupled through a chain drive (not shown) to rotate a drive shaft 32 on which is keyed a spur gear 34 which in turn drives an idler gear 36 by means of a chain 38. The idler gear 36 is mounted on a jack shaft 40. A smaller reduction drive gear 44 is also mounted on the jack shaft 40 and it drives a second chain 46 connected to a sprocket 48 keyed to the rear axle 16. This reduction drive from the prime mover 54 has the jack shaft 40 mounted on the vertically adjustable portion of the leg. This permits the vertical adjustment of the height of the machine without effecting the rear wheel drive.

Attached to the frame 10 as by welding are suitable side panels 50 which are suitably reinforced and a top panel 52 which provides a mounting surface for the prime mover 54. The panels preferably are fabricated from sheet steel, although other materials may be used as desired. A seat 56 is positioned above the top panel to permit a driver to sit and operate the vehicle through the appropriate steering wheel 58 and clutch brake pedals (not shown). A guard rail 60 may be placed about it for the driver's safety. A reel 62 for a hose 64 is positioned on a mounting bracket 66 secured to the top panel 52 to permit a supply of water to be piped to the processing machine for wetting down the compost through a hose and spray unit 68 (FIG. 5).

At the front end of the maching there is pivotally mounted to either side panel 50 a receiving panel 70. These receiving panels 70 are pivotable about a vertical axis (their hinge point) and their particular angular position relative to the side walls is adjustable by the use of stay bars 72 whose ends are bent 90° to fit into adjusting holes in brackets 74 attached respectively to the panels 70 and the main frame 10. The panels 70 are normally positioned with a slight outward protrusion to enable them to better collect the piles of compost as the machine moves them along as will be described.

The rear end of the machine has attached thereto a pair of stacking gates 80 and 82. These gates, suitably reinforced by metal reinforcing bars, are pivoted to each other as at 84 and the forward gates 80 are pivotally mounted on the main frame 10 as at 86. The pivotal mounting is accomplished by suitable hinges. The angular position of these gates 80, 82 which are used to control the width of the processed compost pile, is determined by stay bars 88 and 90, respectively. Both of these stay bars 88 and 90 have bent ends adapted to fit into suitable brackets 92, one bracket being on the gate whose position is to be adjusted, the remaining bracket being on the main frame 10. The brackets 92 each have several adjusting holes to permit the various position adjustments as seen most clearly in FIG. 2.

The prime mover 54 has a second drive shaft 102 which is attached to a drive pulley 104. The drive pulley is adapted to drive suitable drive belts 106 which are fitted over a three-grooved sheave 108. The sheave 108 is mounted on a suitable bearing mounted jack shaft 110. Also mounted on the jack shaft 110 is a drive gear 112 which operates through a drive chain 114 to drive a second drive gear 116 mounted on a third drive shaft 118 positioned in suitable bearings 120. The drive shaft 118 and the jack shaft 110 both extend through the width of the machine and are positioned in suitable bearings in the other side wall. The drive shaft 118 has mounted thereon a pick-up drum 130 best seen in FIGS. 3, 4 and 5. The pick-up drum 130 preferably is constructed to be slightly less in diameter than the height of the piles although it may be used with piles having a lower height than the diameter of the drum. The pick-up drum 130 may be constructed of three cylindrical plates 132 each having its center mounted on the third drive shaft 118. Channel strips forming cross bars 134 are welded across the periphery of the discs 132 and are equally spaced about the periphery of the discs so as to provide a cage-like structure for the drum. A plurality of prongs 136 are bolted at intervals across each channel strip 134 in a staggered pattern, in accordance with one embodiment, such that the teeth are displaced from a center prong 137 outwardly on each successive cross bar or channel strip 134 so as to form two outward spirals of prongs in both outward directions. Additional prongs may be used to balance the loading. These additional prongs are located at optional locations determined by the balancing of the pick-up drum 130. Preferably, the two spirals extend about the circumference of the drum one and one-third times for balanced loading. In a typical 6 foot diameter drum having 96 inch long cross bars, the prongs are displaced outwardly two inches centerline to centerline with the cross bars equally spaced at 21.3° increments about the drum periphery.

Each prong 136 has a base member 138 which may be bolted to the cross bars 134 as by bolts 140 and an upright member 142 (FIG. 7) which is welded to the base member 138 such that when mounted it extends radially outwardly of the pick-up drum 130. At the end portion of the prong 136 there is welded a trapezoidal shaped plate 144. The plane of the plate 144 is generally parallel to the shaft 118. In this manner the prong 136 assumes the general shape of a paddle having advantages as will be described hereinafter. At the periphery of each end disc 132 there is welded an outwardly extending strip 150 to extend the drum width almost to the side panels 50 thereby to prevent the compost from getting between the ends of the pick-up drum and the side panels 50. Also attached to the side panels 50 to form with the strip 150 an interlock, is an outer annular ring member 152 which together with the extension end strip 150 forms a double interlock to prevent compost entering between the end of the pick-up drum and the side panel.

To the rear, above the axis of the pick-up drum, and above the zenith of the arc defined by the prongs, there is positioned a beater or mixing drum 160. This mixing drum 160, formed of a suitable metal drum, is mounted on the jack shaft 110 and is much smaller in diameter than the pick-up drum 130. Typically, the diameter of the mixing drum is less than one-fourth of the diameter of the pick-up drum. Several rows of rectangular diverter plates 162 are attached to the periphery of the mixing drum 160. Each row of diverter plates are positioned such that their plane lies at an angle transverse to the plane of rotation of the several plates, preferably the angle 45° is used. Preferably, the diverter plates 162 of each adjacent row are staggered and are turned at an opposite angle with respect to the plane of rotation of those plates of the rows on either side. Thus, viewing the plates as illustrated in FIG. 5, it is seen that the plates viewed directly from above are at a 45° angle to the right with respect to the plane of rotation whereas the rows of plates on either side are at angle 45° to the left with respect to the plane of rotation. The angle does not have to be 45°, although this angle is preferred for optimum cross mixing of the compost, and may be varied from 0° to 90°. Also, the spacing between the plates of each row may be varied although a spacing of 12 to 13 inches between plates again is preferred. In one preferred embodiment each plate typically has a height in the order of 4 to 5 inches, and a width in the order of 5 to 6 inches. The outside corners of the plates preferably are bevelled or rounded slightly to prevent undue tearing and cutting of the compost. Other dimensions of course, may be used but the broad width rectangular plates are preferred. In fact, plates having a width as small as one to two inches may be used, but any smaller widths are not desired because of the tendency to tear and rip the compost fibers and their inability to achieve the desired cross mixing of the compost.

In a preferred embodiment of the invention, the zenith of the arc or path of rotation defined by the plates should be higher than the zenith of the arc or path of rotation defined by the prongs on the pick-up drum. In any event the mixing drum should be higher than the pile of compost that is to be formed. Further, the pick-up drum in a typical case may be 6 feet in diameter in which case the beater drum would be 18 inches in diameter. With these dimensions, the pick-up drum is driven at a speed of 90 revolutions per minute whereas the beater drum is driven at the slightly higher lineal speed, but much higher angular velocity, of 450 revolutions per minute. With these differences in diameter and rotational speed it is clearly seen that the lineal speed of the diverter plates is greater than the lineal speed of said prongs. This has the advantage that the mixing drum is able to clear the compost as quickly as it is received from the pick-up drum and throw it up and back onto the newly formed pile as will be described. Other drum sizes and speeds may be used, but it is preferred that the lineal velocity of the mixing plates exceed the lineal velocity of the prongs.

A top gate 170 is horizontally hinged to the main frame 10 at the rear to pivot in a vertical plane. Actually, the top panel 52 extends to the rear of the main frame at least as far as the width of the first rear stacking gate 80. The top lid 170 is positionable vertically about the hinge 172 by a support wire 174 controlled by a suitable ratcheted reel 176 mounted on the top panel 52. This top lid 170 functions as will be described to control the height of the processed compost.

The hydraulic and electrical control system is illustrated in FIG. 8. Referring to this figure, a conventional battery 200 is connected to a suitable control panel 202 which may contain an ignition switch and other desired gauges for controlling and indicating the operation of the various portions of the unit. It may include for example, inputs from microswitches 204 which sense the position of the hydraulic steering control cylinders 206. Microswitches 204 may control indicator lights 208 to indicate the direction of operation of the hydraulic motors.

The hydraulic motors themselves which turn the front wheels 12 are controlled from the hydraulic pumping unit 100 which is driven by the prime mover 54. The hydraulic system including hydraulic pump 100 operates in a conventional manner operating through suitable flow control valves 210 to a steering control unit 212 which controls pressure permitted to pass through the respective left and right steering cylinders 206 which in turn operate through a dual solenoid valve 214 to control the operation of left and right hydraulic steering motors. The dual solenoid valve 214 has turn indicator lights and the microswitches 204 to provide a suitable electrical indication of their proper operation on the panel 202. The hydraulic pump has a supply tank 220 and suitable connecting lines for supplying the hydraulic pump with the necessary hydraulic fluid for its operation. The operation of the control unit seen in FIG. 8 is such that under control of the steering unit 212 the front wheels 12 of the processing machine may be turned so that the machine may be directed to maneuver down along and over the piles of compost 13 to be processed. Any other steering system may be used as desired.

In its operation, the machine is driven by the operator to one end of the pile 13, aligned with the direction of the pile. At this time, power is applied to the pick-up drum 130 and mixing drum 160 such that both are rotating counterclockwise. The receiver panels 70 are adjusted outwardly as needed to envelop the pile. The machine is now moved foward over the pile of compost. As the machine moves forward over the pile of compost to be turned, the compost is engaged by the prongs of the pick-up drum 130. Prior to engaging the pile it is desirable to adjust the height of the machine such that the tips of the prongs 136 lightly brush the deck or surface of the platform on which the compost is stacked. This permits the flat ended, paddle-like prongs of pick-up drum itself to sweep the compost and clean the path underneath the drum without the necessity for additional brushing or scraping gear.

As the compost is engaged by the rotating prongs of the pick-up drum 130, the compost including the individual fibers of the compost are picked-up and moved upwardly and rearwardly, as seen most clearly in FIG. 5, over the pick-up drum. The prongs, having a blunt tip, tend to gently lift the small pieces of the compost, acting in some respects like small shovels, significantly without tearing the elements of hay and other fibrous material, Further, having the blunt wide surface, the prongs also are able, as the fermentation continues and the compost become finer and finer, to do a more effective job of picking up the smaller particles than is the case if merely slender tines are used as in the prior art. Their wide surface also facilitates the sweeping and cleaning action as the machine moves across the deck as noted.

As the compost moves over the pick-up drum 130, it is thrown and transferred onto the more rapidly moving mixing drum 160. The mixing drum 160 is geared, as noted hereinbefore, in a preferred embodiment of this invention, to rotate five times as fast as the pick-up drum. These speeds will vary according to drum size and other speeds may also be used, and the beater drum may be rotated more slowly than the pick-up drum, but this is not preferred because it lacks many of the advantages noted. As the compost strikes the diverter plates 162 of the mixing drum 160, it is thrown upwardly and to the rear with the rapid moving plates tending to throw, as successive rows of plates come in contact with the moving compost, the compost first to the left and then to the right effecting a very thorough mixing of the compost within itself and affording a better opportunity for aeration of the compost. Here again the use of the broad diverter plates, rather than slender tines, is more gentle on the compost and in addition does a more effective job of mixing and further is able to more effectively handle the finer particles of fermented compost than would otherwise be possible.

As mentioned hereinbefore, by adjustment of the position of the stacking gates 80 and 82, the width of the resulting watered, aerated and mixed compost pile at the rear of the machine is controlled. The height of the restacked pile is controlled by the adjustment of the top lid 170 utilizing the adjustment wheel 176.

In other embodiments, each of the diverter plates within each row may be positioned at different angles with respect to their plane of rotation. Alternatively, the plates of adjacent rows may be at different angles with respect to their plane of rotation and not necessarily at opposite angles as previously described.

There has thus been described a relatively simple compost processing machine that is capable of more effectively and thoroughly aerating and mixing the compost than was heretofore possible. The machine is capable of handling finer compost materials and also is less destructive of the composting fibers. Also, the machine cleans the deck on which the compost is stacked as it operates.

It is obvious that many embodiments may be made of this inventive concept and that many modifications may be made in the embodiments hereinbefore described. Therefore, it is to be understood that all descriptive matter herein is to be interpreted merely as illustrative, exemplary and not in a limited sense. It is intended that various modifications which might readily suggest themselves to those skilled in the art be covered as far as the prior art permits.

What is claimed is:

1. In a compost processing machine for separating, mixing, and stacking fermenting compost, said machine having front and back ends and side walls and being mounted on wheels to facilitate the traversal of a stack of said compost during processing, the improvement comprising:

a rotatable pick-up means mounted between said side walls adjacent the front end of said machine, drive means for rotating said pick-up means thereby to lift and move said compost rearwardly as said machine moves forward, rotatable means having an axis of rotation and at least one planar surface disposed at an angle to said axis of rotation to receive and divert compost from said pick-up means rearwardly and toward the side walls, and means for rotating said rotatable means at a greater peripheral velocity than that of said pick-up means, thereby to divert, mix and stack said compost at the back end of said machine.

2. An apparatus according to claim 1 wherein said rotatable pick-up means has radially extending prongs and said prongs have an enlarged end portion, thereby to reduce the cutting of fibers in said compost and enhance the ability of the prongs to pick up and restack finely divided compost.

3. An apparatus according to claim 2 wherein the extremity of said end portion is flat and substantially parallel to the axis of rotation of said rotatable pick-up means thereby to permit the sweeping of the surface traversed by said machine.

4. An apparatus according to claim 1 wherein said rotatable means includes a drum having a peripheral surface, said at least one planar surface comprising a plurality of diverter plates disposed in rows on said peripheral surface parallel to the axis of rotation of said drum, the plates of each adjacent row lying at opposite angles with respect to their axis of rotation, thereby to enhance cross-mixing of said compost.

5. An apparatus according to claim 4 wherein said diverter plates are positioned at about a 45° angle to their axis of rotation.

6. An apparatus according to claim 4 wherein said plates are each perpendicular to said peripheral surface.

7. In a compost processing machine for separating, mixing, and stacking fermenting compost, said machine having front and back ends and side walls and being mounted on wheels to facilitate the traversal of a stack of said compost during processing, the improvement comprising:

a rotatable pronged pick-up drum mounted between said side walls adjacent the front end of said machine, drive means for rotating said pick-up drum thereby to lift and move said compost rearwardly as said machine moves forward, rotatable diverter plates positioned to receive compost from said pick-up drum wherein said diverter plates are disposed in rows parallel to their axis of rotation, the plates of each adjacent row lying at opposite angles with respect to their axis of rotation, thereby to enhance cross-mixing of said compost, and means for rotating said plates at a greater peripheral velocity than that of said pick-up drum, thereby to divert, mix and stack said compost at the back end of said machine.

8. An apparatus according to claim 7, wherein said prongs have an enlarged end portion, thereby to reduce the cutting of fibers in said compost and enhance the ability of the prongs to pick-up and restack finely divided compost.

9. An apparatus according to claim 7 wherein the extremity of said end portion is flat and substantially parallel to the axis of rotation of said drum thereby to facilitate sweeping the surface over which said machine traverses.

10. In a compost processing machine for separating, mixing, and stacking fermenting compost, said machine having front and back ends and side walls and being mounted on wheels to facilitate the traversal of a stack of said compost during processing, the improvement comprising:

a rotatable pronged pick-up drum mounted between said side walls adjacent the front end of said machine, drive means for rotating said pick-up drum thereby to lift and move said compost rearwardly as said machine moves forward, rotatable diverter plates positioned to receive compost from said pick-up drum, and means for rotating said plates at a greater peripheral velocity than that of said pick-up drum, thereby to divert, mix and stack said compost at the back end of said machine, wherein the path of rotation defined by said plates has a zenith higher than the zenith of the path of rotation defined by said prongs.

* * * * *